(12) United States Patent
Balasubramanian et al.

(10) Patent No.: US 9,336,174 B1
(45) Date of Patent: May 10, 2016

(54) DYNAMIC INTERFACE MODEL

(71) Applicant: Cisco Technology, Inc., San Jose, CA (US)

(72) Inventors: Koussalya Balasubramanian, Santa Clara, CA (US); Chris Bullock, Round Rock, TX (US); Chuong Nguyen, Austin, TX (US); Yu Liu, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 357 days.

(21) Appl. No.: 13/953,056

(22) Filed: Jul. 29, 2013

(51) Int. Cl.
*G06F 13/36* (2006.01)
*G06F 13/14* (2006.01)
*G06F 3/00* (2006.01)
*G06F 13/40* (2006.01)

(52) U.S. Cl.
CPC .................................. *G06F 13/4027* (2013.01)

(58) Field of Classification Search
None
See application file for complete search history.

(56) References Cited

U.S. PATENT DOCUMENTS

| | | | | |
|---|---|---|---|---|
| 8,281,067 B2* | 10/2012 | Stolowitz | ............... | G06F 3/061 711/114 |
| 8,281,068 B2* | 10/2012 | Kono | ................... | G06F 1/3221 711/114 |
| 8,824,261 B1* | 9/2014 | Miller | ................. | G11B 33/142 360/97.19 |
| 2010/0088469 A1* | 4/2010 | Motonaga | ............ | G06F 3/0613 711/113 |
| 2012/0239945 A1 | 9/2012 | Balasubramanian et al. | | |

* cited by examiner

*Primary Examiner* — David E Martinez
(74) *Attorney, Agent, or Firm* — Edell, Shapiro & Finnan LLC

(57) ABSTRACT

An interface device receives at least one access command with at least one corresponding slave address on a bus. The interface device reads a configuration register, and responsive to the reading of the configuration register, the interface device selects one of a plurality of interface architecture configurations. The interface architecture configurations allow the interface device to operate as either a single physical interface entity or as multiple virtual interface entities. The interface device processes the access command according to the selected interface architecture configuration.

19 Claims, 4 Drawing Sheets

DYNAMIC INTERFACE MODEL

TECHNICAL FIELD

The present disclosure relates to interfacing with integrated circuits.

BACKGROUND

With an increasing trend toward high-density integrated circuit packages, it is common that architectures move from single chips to dual chips, dual chips to quad chips, quad chips to octal chips, etc. An octal chip allows for higher throughput due to the larger payload of data in comparison to the overhead needed to send the data. Using the same interface model for quad and octal chips may not be efficient. However, as newer, higher capacity "chips" come into production, these higher capacity chips have to interact with legacy devices that do not have the capability to process data in the newer, larger payload format. Without backward compatibility at the interface between the higher capacity chip and the legacy devices, the newer chip cannot perform up to its capacity, if at all.

DESCRIPTION OF EXAMPLE EMBODIMENTS

Overview

Techniques are presented herein in which an interface device on a bus receives at least one access command with at least one corresponding slave address. The interface device reads a configuration register, and responsive to the reading of the configuration register, the interface device selects one of a plurality of interface architecture configurations. The interface architecture configurations allow the interface device to operate as either a single physical interface entity or as multiple virtual interface entities. The interface device processes the access command according to the selected interface architecture configuration.

Example Embodiments

According to the techniques and concepts presented herein, a Power over Ethernet (PoE) switch includes an interface device (chip) coupled to a host system by an Inter-Integrated Circuit (I2C or I²C) bus. The flexible interface can be configured in a number of different interface architecture configurations according to the capabilities of the host system. The different interface architecture configurations allow the interface chip and the host system to communicate with varying protocols. While the example embodiment described herein is that of a PoE switch, other systems are also envisioned (e.g., PROM devices, power control devices, etc.), and the techniques presented herein are not limited to PoE switches. Any chip with an interface to host software may use the techniques presented herein.

Figure 1:
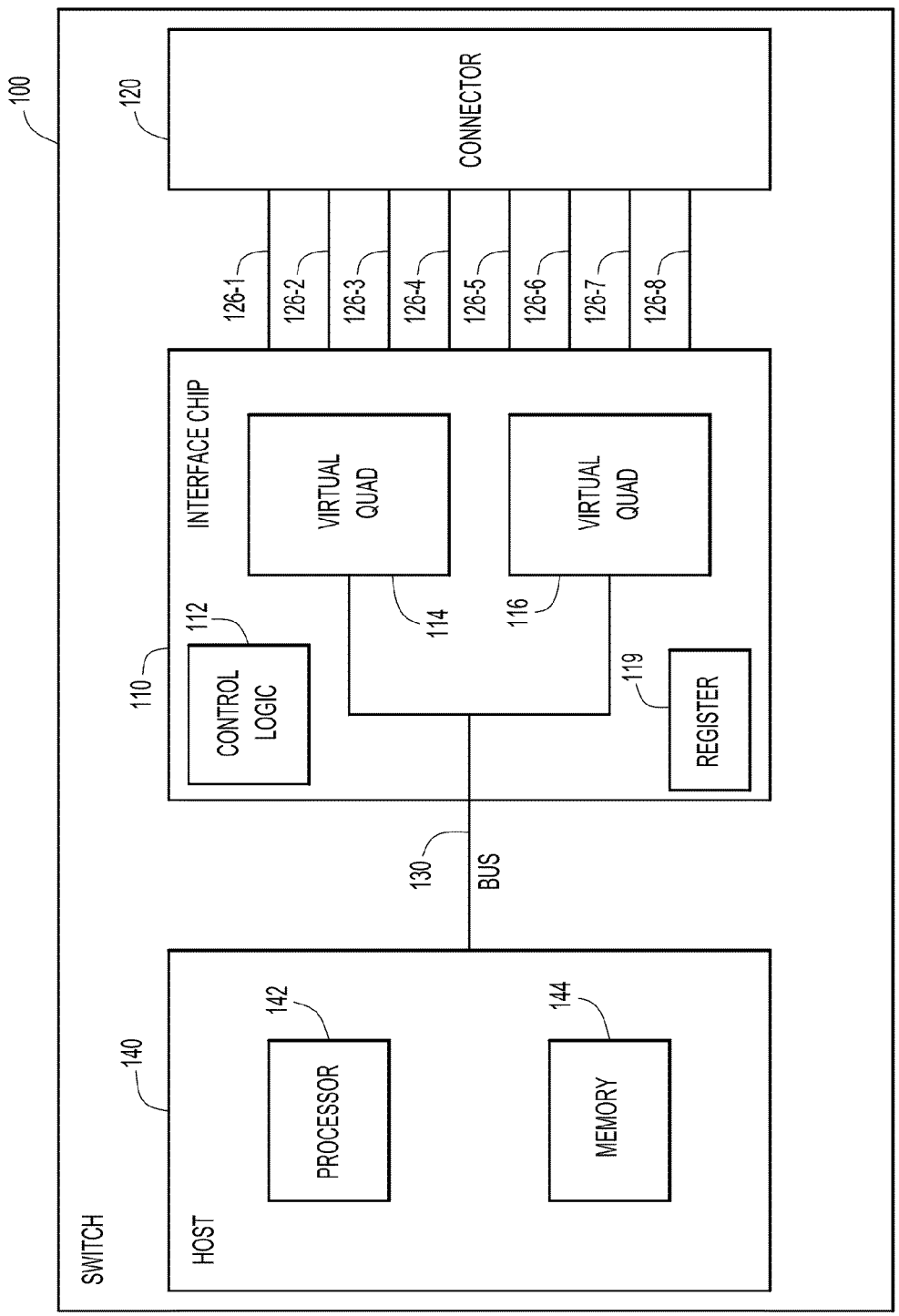
FIG. 1 is a block diagram of an interface device in a first interface architecture configuration.
Figure 2:
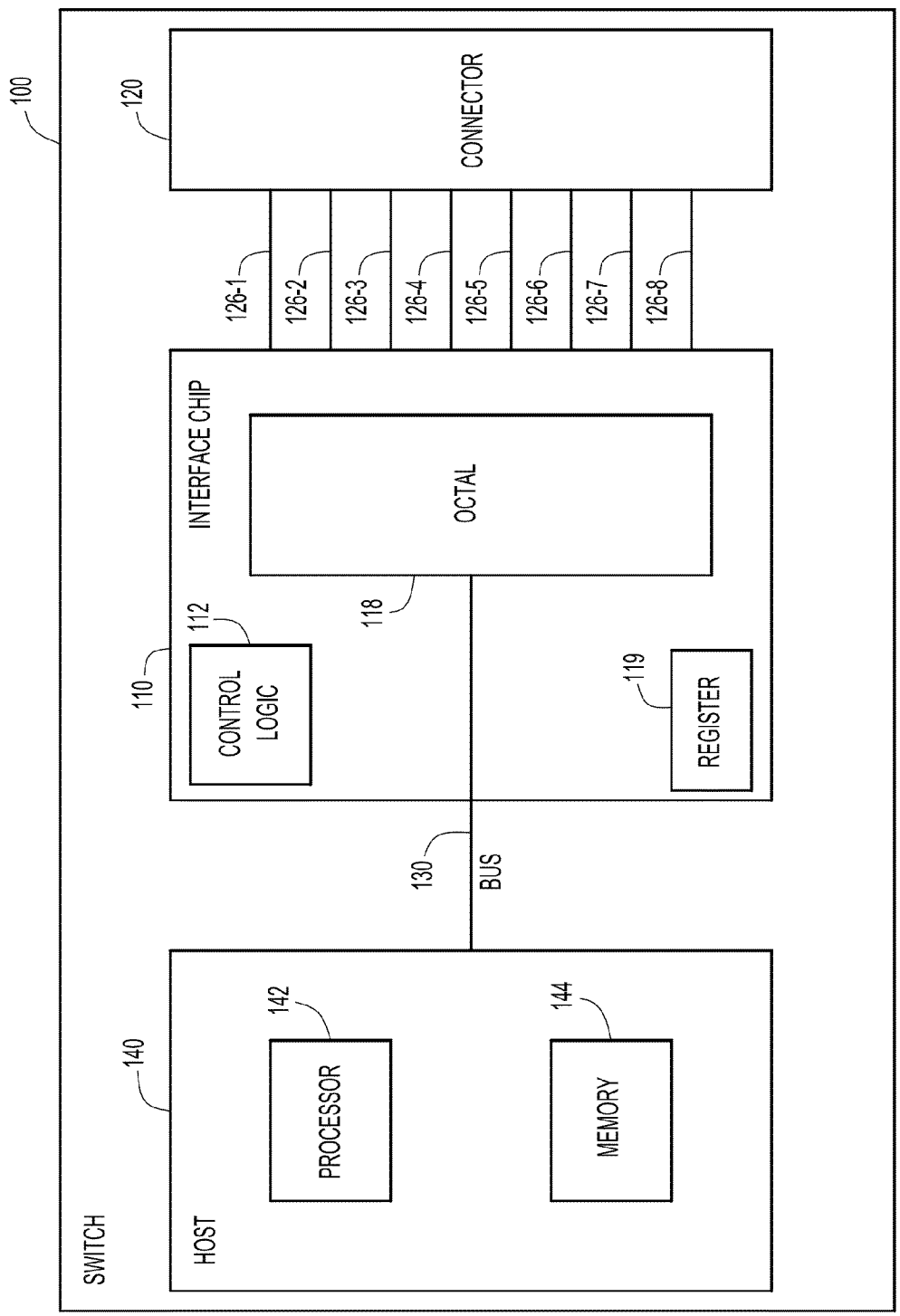
FIG. 2 is a block diagram of the interface device in a second interface architecture configuration.

Reference is now made to FIGS. 1 and 2, which show a switch 100 comprising an interface chip 110, a connector 120 and a host ("host system") 140. FIGS. 1 and 2 show two different interface architecture configurations of the interface chip 110. In FIG. 1, the interface chip 110 is configured as two "virtual" interface entities/components, and in FIG. 2, the interface chip 110 is configured as a single octal interface entity/component.

There is a plurality of ports 126-1 through 126-8 between the interface chip 110 and the connector 120. In one example, the connector 120 is a group of RJ-45 jacks so that the interface chip 110 can be part of a PoE switch powering multiple ports on an Ethernet network.

The interface chip 110 is coupled to host system 140 by bus 130. Bus 130 may be a two wire bus, such as an I2C bus, or any other type of communication bus. If bus 130 requires a bus master, then either the interface chip 110 or the host system 140 can act as the bus master.

Host system 140 can be any type of computing device, and is represented generally by processor 142 and memory 144. However, the host device 140 may consist of a Field Programmable Gate Array (FPGA) or simply software running on a device.

The interface chip 110 includes control logic 112 that performs control of the operations of interface chip 110, including, but not limited to, reconfiguring the interface as described herein. The interface chip 110 further includes a register 119 that stores configuration information used by the control logic 112 to configure the interface chip 110. Other memory registers not explicitly depicted may be present to store information in the interface chip 110. The interface chip 110 may be implemented by digital logic gates in an Application Specific Integrated Circuit (ASIC). The control logic 112 thus may consist of digital logic gates or as a central processing unit and memory, as described further hereinafter.

FIG. 1 shows one interface architecture configuration in which the interface chip 110 is configured as two virtual quad interface entities or components shown at reference numerals 114 and 116. Each virtual quad interface entity 114, 116 provides an interface for bus 130 to communicate with four of the ports 126-1 to 126-8. In one example, virtual quad interface entity 114 provides an interface between bus 130 and ports 126-1,2,3,4, while virtual quad interface entity 116 provides an interface between bus 130 and ports 126-5,6,7,8.

Virtual quad interfaces 114 and 116 each have their own address on bus 130, and in one approach, the address for two virtual quad interfaces are consecutive. For example, if the interface chip 110 is set with a slave address "0x20" on an I2C bus, virtual interface 114 will respond to I2C slave address "0x20" with information from the first four ports, and virtual interface 116 will respond to slave address "0x21" with information from the second four ports. In this way, the host system 140 interacts with the interface chip 110 in the same way as it would with two separate quad chips on the same I2C bus.

In one approach, the configuration of FIG. 1 is the default configuration, since a quad chip would likely be the immediate predecessor to an octal version of the interface chip 110. Host systems may be a generation behind the chips with the latest interface device, and these older (legacy) host systems cannot determine (i.e., are unaware) that the interface chip 110 can be reconfigured. Consequently, the older host systems may not know to evaluate content of register 119 to determine the interface configuration. To optimize backward compatibility and ensure that host systems, which may be a generation behind, can communicate with interface chip 110, the default configuration of the interface chip 110 is set to emulate the immediate predecessor type of chip, i.e. two virtual quad interfaces for a physical octal chip. Other default configurations are envisioned, such as dual or single virtual interface entities, to accommodate a host system from any previous generation.

FIG. 2 shows a specific form of a second interface architecture configuration in which the interface chip 110 is configured as octal interface component 118. In this configuration, octal interface entity (component) 118 allows all eight ports 126-1 through 126-8 to be accessed with a single address on bus 130. This configuration allows the interface chip 110 to have increased throughput over the configuration of FIG. 1, since there is less overhead with each transmission over bus 130.

Octal interface component 118 is addressed with a single address on bus 130, and can read/write data pertaining to all eight ports in the same address cycle without having to reissue the address for each set of four ports. In contrast, when the interface chip 110 is configured as virtual quad interfaces 114 and 116 (as shown in FIG. 1), they each have their own address on bus 130. Host system 140 would have to reissue the address for the second set of ports to send the same sixteen bit chunks of data. There is also additional address space conservation that is realized when the interface chip 110 is treated as octal interface, as in this case in which one address is enough to access both virtual quads.

Figure 3:
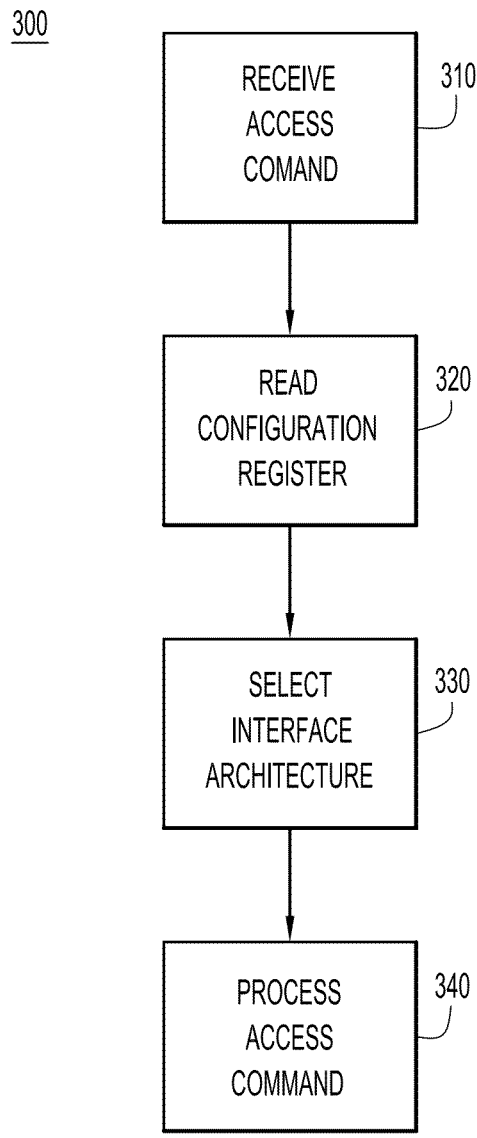
FIG. 3 is a flow chart of a method for dynamically selecting an interface architecture according to the techniques presented herein.

FIG. 3 shows a flow chart for a method 300 for the selective configuration of the interface 110 chip to process an access command. In step 310, interface chip 110 receives an access command over bus 130. An access command is, for example, a command to read (or write) memory registers corresponding to port 126-5. The access command in this instance would specify the device address corresponding to desired port, the command to read data (or write), and the offset of the specific register(s) to start reading.

To process the command, interface chip 110 needs to know what interface architecture configuration to adopt/use. At step 320, control logic 112 reads configuration register 119, which stores the configuration information. For example, register 119 may be configured such that a "0" signals or indicates that two virtual quad interface entities or components are used, and a "1" signals or indicates that a single octal interface entity or component is used. In another example, register 119 may be a multi-bit register that stores more than two configurations. With a multi-bit register 119, an octal chip can be made to virtualize multiple configurations including quad interface entities, dual interface entities, and/or single interface entities.

Following the example of an access command to read port 126-5 started above, control logic 112 reads register 119 to adopt the proper configuration that host system 140 expects. If host system 140 expects quad interfaces, with ports 126-1, 2,3,4 at address "0x20," and ports 126-5,6,7,8 at address "0x21," then a command to read data from port 126-5 would include the second device address, "0x21." In contrast, if host system 140 knows that all eight ports 126-1 through 126-8 are found through a single octal interface chip, then the command to read data would include the first device address, "0x20." If host system 140 wants to ensure that interface 110 is properly configured to process subsequent access commands, host system 140 specifically instructs control logic to write to register 119 specifying the proper configuration. In this example, since host system 140 is capable of interacting with an octal interface, it has written this into register 119 with, for example a "1."

After reading register 119, control logic 112 selects the interface architecture for interface 110 at step 330. In one example, register 119 stores information indicating that the interface device 110 operates either as one interface entity that uses the entire physical chip or as two virtual interface entities that each uses a portion (e.g., "half") of the chip. For instance, register 119 stores information indicating that the interface 110 operates as a single octal interface entity or component 118 (as shown in FIG. 2) to match its physical capability, or as two virtual quad interface entities or components 114,116 (as shown in FIG. 1) to maintain backward compatibility with previous generation host systems. After the interface architecture has been selected and configured, the control logic 112 processes the access command at step 340.

Furthering the specific example of an access command to read port 126-5 from a single address, when control logic 112 reads the "1" previously written to register 119, it selects the configuration for the single octal interface entity or component 118 shown in FIG. 2. Control logic 112 then processes the command to a single address on bus 130, and reads from the offset of the specified register corresponding to port 126-5 back to host system 140 through bus 130.

Figure 4:
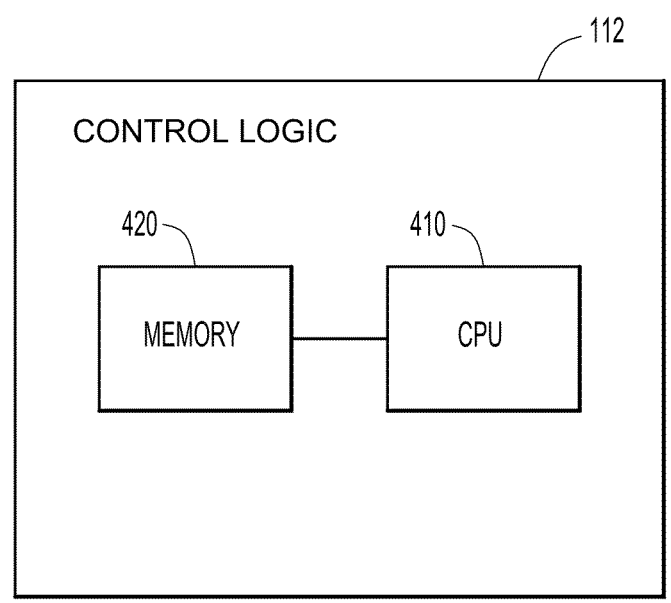
FIG. 4 is a block diagram of a generic processing system that may be used to implement dynamic selection of an interface architecture.

The functions of control logic 112 described herein may also be performed by a generic processing system, as shown in FIG. 4. Memory 420 may comprise read only memory (ROM), random access memory (RAM), magnetic disk storage media devices, optical storage media devices, flash memory devices, electrical, optical, or other physical/tangible memory storage devices. At least some of memory 420 may comprise registers for storing and passing information in connection with interface 110. The processor 410 is, for example, a microprocessor or microcontroller that executes instructions for the interface logic. Thus, in general, the memory 420 may comprise one or more tangible (non-transitory) computer readable storage media (e.g., a memory device) encoded with software comprising computer executable instructions and when the software is executed (by the processor 410) it is operable to perform the operations described herein in connection with interface 110.

In summary, a method is provided comprising: receiving at an interface device on a bus at least one access command with at least one corresponding slave address; reading a configuration register in the interface device; responsive to the reading of the configuration register, selecting one of a plurality of interface architecture configurations for the interface device so as to operate the interface device as a single physical interface entity or as multiple virtual interface entities; and processing the at least one access command according to the selected interface architecture configuration.

Moreover, one or more computer readable storage media are provided encoded with software comprising computer executable instructions and when the software is executed operable to: receive at an interface device on a bus at least one access command with at least one corresponding slave address; read a configuration register in the interface device; responsive to the reading of the configuration register, select one of a plurality of interface architecture configurations for the interface device so as to operate the interface device as a single physical interface entity or as multiple virtual interface entities; and process the at least one access command according to the selected interface architecture configuration.

In addition, an apparatus is provided comprising: a configuration register; an interface chip configured to process at least one access command with at least one corresponding slave address on a bus according to one of a plurality of interface architecture configurations; and control logic configured to select one of the plurality of interface architecture configurations based on content of the configuration register.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   receiving at an interface device on a bus at least one access command from a host on the bus, the at least one access command including at least one corresponding slave address;
   reading a configuration register in the interface device;
   selecting one of a plurality of interface architecture configurations for the interface device so as to operate the interface device for the host as a single physical interface entity on the bus or as multiple virtual interface entities on the bus;
   responsive to the at least one access command including a command to write to the configuration register, selecting an interface architecture configuration corresponding to the command to write to the configuration register; and
   processing the at least one access command according to the selected interface architecture configuration.

2. The method of claim 1, wherein receiving comprises receiving the at least one access command over an Inter-Integrated Circuit (I2C) bus.

3. The method of claim 1, wherein reading comprises reading a multi-bit register that stores data to indicate use of each of the plurality of interface architecture configurations.

4. The method of claim 3, wherein selecting comprises selecting among the plurality of interface architecture configurations comprising at least two of a single, dual, quad, and octal interface entities.

5. The method of claim 1, wherein selecting the interface architecture configuration comprises selecting two virtual quad interface entities derived from a physical octal interface.

6. The method of claim 5, further comprising:
   storing a default value of information in the configuration register to indicate that a default interface architecture configuration is two virtual quad interface entities,
   wherein the command to write to the configuration register overrides the default value of information in the configuration register.

7. The method of claim 5, wherein the two virtual quad interface entities have consecutive slave addresses on the bus.

8. The method of claim 1, wherein the processing the at least one access command comprises communicating over an Ethernet connection.

9. The method of claim 1, wherein selecting comprises selecting the single physical interface entity configured for a higher throughput than can be achieved with the multiple virtual interface entities.

10. One or more non-transitory computer readable storage media encoded with software comprising computer executable instructions and when the software is executed operable to:
    receive at an interface device on a bus at least one access command from a host on the bus, the at least one access command including at least one corresponding slave address;
    read a configuration register in the interface device;
    select one of a plurality of interface architecture configurations for the interface device so as to operate the interface device for the host as a single physical interface entity on the bus or as multiple virtual interface entities on the bus;
    responsive to the at least one access command including a command to write to the configuration register, select an interface architecture configuration corresponding to the command to write to the configuration register; and
    process the at least one access command according to the selected interface architecture configuration.

11. The non-transitory computer readable storage media of claim 10, wherein the instructions operable to read comprise instructions operable to read a multi-bit register that stores data to indicate use of each of the plurality of interface architecture configurations.

12. The non-transitory computer readable storage media of claim 11, wherein the instructions operable to select comprise instructions operable to select among the plurality of interface architecture configurations comprising at least two of single, dual, quad, and octal interface entities.

13. The non-transitory computer readable storage media of claim 10, wherein the instructions operable to select comprise instructions operable to select two virtual quad interface entities derived from a physical octal interface entity.

14. The non-transitory computer readable storage media of claim 13, further comprising instructions operable to:
    store a default value of the configuration register which indicates that a default interface architecture configuration is two virtual quad interface entities,
    wherein the command to write to the configuration register overrides the default value of information in the configuration register.

15. The non-transitory computer readable storage media of claim 13, wherein the two virtual quad interface entities have consecutive slave addresses on the bus.

16. An apparatus comprising:
    a configuration register;
    an interface chip configured to process at least one access command over a bus from a host, the at least one access command including at least one corresponding slave address on the bus according to one of a plurality of interface architecture configurations; and
    control logic configured to select one of the plurality of interface architecture configurations based on content of the configuration register so as to operate the interface chip for the host as a single physical interface entity on the bus or as multiple virtual interface entities on the bus,
    wherein, responsive to the at least one access command including a command to write to the configuration register, the control logic is further configured to select an interface architecture configuration corresponding to the command to write to the configuration register.

17. The apparatus of claim 16, wherein the single physical interface entity is a physical octal interface entity and the multiple virtual interface entities are two virtual quad interface entities derived from a physical octal interface entity.

18. The apparatus of claim 16, wherein the configuration register is configured to store a default value that indicates a default interface architecture configuration is two virtual quad interface entities.

19. The apparatus of claim 16, wherein the two virtual quad interface entities have consecutive slave addresses on the bus.

* * * * *